United States Patent
Kumar et al.

(10) Patent No.: US 12,307,224 B2
(45) Date of Patent: May 20, 2025

(54) CROSS-LAYER POWER OPTIMIZATION OF PROGRAM CODE AND/OR SOFTWARE ARCHITECTURE

(71) Applicant: International Business Machines Corporation, Armonk, NY (US)

(72) Inventors: Dinesh Kumar, Poughkeepsie, NY (US); Colleen Ann Weller, Wappingers Falls, NY (US); Margaret Annabelle Allen, Jericho, VT (US); Addison Daniel Ferrari, New Paltz, NY (US); Gary A. Van Huben, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 18/334,935

(22) Filed: Jun. 14, 2023

(65) Prior Publication Data
US 2024/0419417 A1    Dec. 19, 2024

(51) Int. Cl.
*G06F 8/41* (2018.01)

(52) U.S. Cl.
CPC ................................. *G06F 8/4432* (2013.01)

(58) Field of Classification Search
CPC .................................................... G06F 8/4432
See application file for complete search history.

(56) References Cited

U.S. PATENT DOCUMENTS

| | | | |
|---|---|---|---|
| 6,976,178 B1 * | 12/2005 | Kissell | G06F 1/26 |
| | | | 713/320 |
| 7,222,030 B2 | 5/2007 | Banginwar | |
| 11,009,836 B2 | 5/2021 | Hoffmann | |
| 11,237,894 B1 | 2/2022 | Baum | |
| 11,263,077 B1 | 3/2022 | Seznayov | |
| 2004/0268159 A1 | 12/2004 | Aasheim | |
| 2005/0229149 A1 | 10/2005 | Munter | |
| 2007/0198864 A1 | 8/2007 | Takase | |

(Continued)

OTHER PUBLICATIONS

Barde, Kaushik, et al., SEPIA: A Framework for Optimizing Energy Consumption in Android Devices, 12th Annual IEEE Consumer Communications and Networking Conference (CCNC), Jan. 2015, 8 pages, [retrieved on Jan. 14, 2025], Retrieved from the Internet: <URL:http://ieeexplore.ieee.org/>.*

(Continued)

*Primary Examiner* — Geoffrey R St Leger
(74) *Attorney, Agent, or Firm* — CANTOR COLBURN LLP; Randy Emilio Tejeda (57) ABSTRACT

According to a technique of code development, a plurality of subsystem power profiles for a corresponding plurality of subsystems of a host platform in a production data processing environment are received. Each of the subsystem power profiles specifies power consumption of a corresponding one of the plurality of subsystems across a range of workload traffic intensities. Based on the plurality of power profiles, source code and/or software architecture of the source code is power-optimized in a development data processing environment such that, in the production data processing environment, power consumption per unit of performance of an executable program derived from the source code is improved.

18 Claims, 6 Drawing Sheets

(56) References Cited

U.S. PATENT DOCUMENTS

| | | | | |
|---|---|---|---|---|
| 2007/0260894 | A1* | 11/2007 | Aguilar | G06F 11/3051 713/300 |
| 2011/0154309 | A1 | 6/2011 | Sazegari | |
| 2013/0046967 | A1* | 2/2013 | Fullerton | G06F 1/32 713/100 |
| 2015/0370681 | A1* | 12/2015 | Tonry | G06F 11/24 702/58 |
| 2017/0045927 | A1* | 2/2017 | Bahgsorkhi | G06F 11/3062 |
| 2023/0071775 | A1* | 3/2023 | Kachare | G06F 1/3287 |

OTHER PUBLICATIONS

"Kalman Filter Explained Simply," 13 pages, accessed May 26, 2023 from https://thekalmanfilter.com/kalman-filter-explained-simply/.

"Numerical Method Allowing Multi-Layer Optical Model Evaluation in Production Environment," Mar. 6, 2014, 9 pages, IPCOM000235532D, ip.com.

"Power Profiler," Mar. 26, 2013, 6 pages, IPCOM000226277D, ip.com.

"Software Power Profiler," Jun. 6, 2012, 4 pages, IPCOM000218651D, ip.com.

Fu et al., "A Cross-Layer Power and Timing Evaluation Method for Wide Voltage Scaling," 2020 57th ACM/IEEE Design Automation Conference (DAC), San Francisco, CA, USA, 2020, pp. 1-6, doi: 10.1109/DAC18072.2020.9218682.

Rao et al., "Real-Time Application Energy Monitoring Tool," Feb. 18, 2014, 12 pages, IPCOM000234947D, ip.com.

Rodero, et al., "Cross-Layer Application-Aware Power/Energy Management for Extreme Scale Science," 4 pages, Apr. 1, 2013, ResearchGate.

Zaman et al., "Towards a Cross-Layer Framework for Accurate Power Modeling of Microprocessor Designs," 2018 28th International Symposium on Power and Timing Modeling, Optimization and Simulation (PATMOS), Platja d'Aro, Spain, 2018, pp. 229-236, doi: 10.1109/PATMOS.2018.8464153.

* cited by examiner

CROSS-LAYER POWER OPTIMIZATION OF PROGRAM CODE AND/OR SOFTWARE ARCHITECTURE

BACKGROUND OF THE INVENTION

This disclosure relates to data processing and, more particularly, to the development, execution, and monitoring of power-optimized program code.

Power consumption and the concomitant operational costs and heat dissipation have become key limiting factors of the practical scale and performance of data processing systems, such as enterprise-class servers and data storage systems. For many years, monitoring and controlling system power consumption has been an area of focus for hardware engineers in the computer and integrated circuit design industries. Hardware engineers have achieved power reductions, for example, by lowering chip voltage supply levels and implementing power-saving features in hardware, such as selectively powering down portions of integrated chips, subsystems, or systems, and by implementing specialized circuits to handle common and compute-intensive tasks.

In general, even with significant focus by hardware engineers on power management, code developers responsible for developing the software that executes on hardware platforms have conventionally employed coding practices that are power-agnostic. As a result, potential power optimizations at the chip, subsystem, and system levels can remain unused. Further, even if a code developer does desire to employ power-aware programming practices, the code developer may be unaware of the availability of power-saving hardware features, untrained in the best coding practices to leverage the power-saving hardware features, or uncertain of how various design choices, such as program architecture, instruction selection and ordering, data structure layout, caching behaviors, database and function library selection, etc., affect overall program power consumption. Further complicating these considerations is the fact that software often runs in very different data processing environments, with differing processing hardware, performance and scheduling requirements, workloads, service level agreements (SLAs), and qualities of service (QOS) constraints. Consequently, in many cases, software as executed in a production environment is not power-optimized for the characteristics of that particular production environment.

BRIEF SUMMARY

The present disclosure appreciates that power consumption attributable to program code can be optimized through capture of hardware power data in a production environment and the use of the hardware power data within a development environment to develop and/or optimize the program code and/or its software architecture.

In one or more embodiments, a plurality of subsystem power profiles for a corresponding plurality of subsystems of a host platform in a production data processing environment are received. Each of the subsystem power profiles specifies power consumption of a corresponding one of the plurality of subsystems across a range of workload traffic intensities. Based on the plurality of power profiles, source code and/or the software architecture of the source code is power-optimized in a development data processing environment such that, in the production data processing environment, power consumption per unit of performance of an executable program derived from the source code is improved.

DETAILED DESCRIPTION

Figure 1:
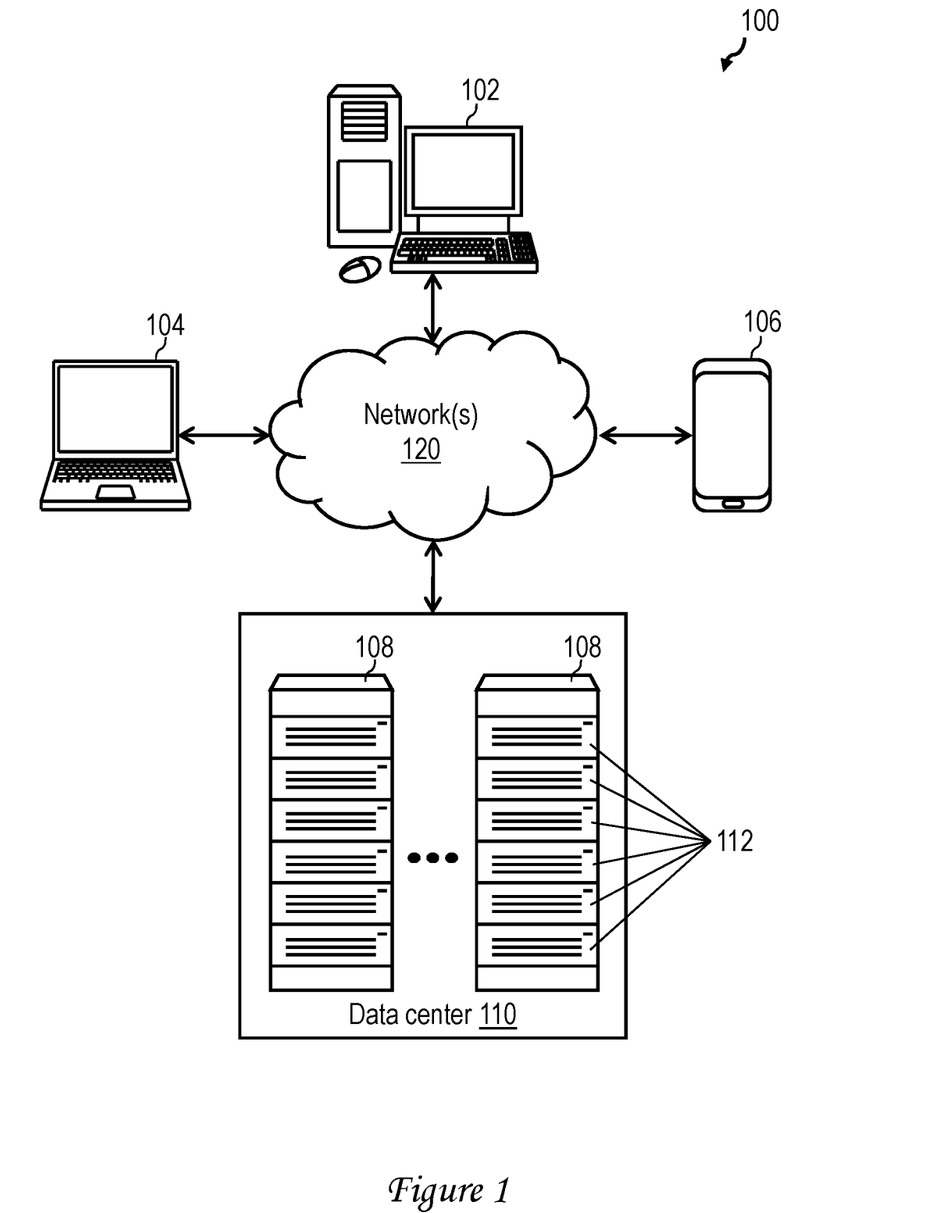
FIG. 1 is a high-level block diagram of an exemplary data processing environment in accordance with one embodiment.

With reference to the figures and with particular reference to FIG. 1, there is illustrated a high-level block diagram of an exemplary data processing environment 100 in accordance with one embodiment. As shown, data processing environment 100 includes one or more host platforms, such as one or more desktop computer systems 102, one or more laptop computer systems 104, one or more tablet or mobile devices 106, and one or more server computer systems 108. Server computer systems 108, which in some embodiments can be harnessed together in a data center 110 to support large and/or numerous workloads, can each include one or more drawers 112, providing, for example, hardware processing, data storage, and/or input/output (I/O) resources. The host platforms can be coupled to one or more network(s) 120 (e.g., local area networks (LANs) and/or wide area networks (WANs)) to enable communication between host platforms and/or other network-available resources.

Within data processing environment 100, one or more of the host platforms can be employed as a production environment in which program code is executed as a workload. One or more of the host platforms within data processing environment 100 can also be employed as a development environment in which program code deployed to the production environment is developed. Further details regarding exemplary development and production environments are discussed below with reference to FIG. 3.

Figure 2:
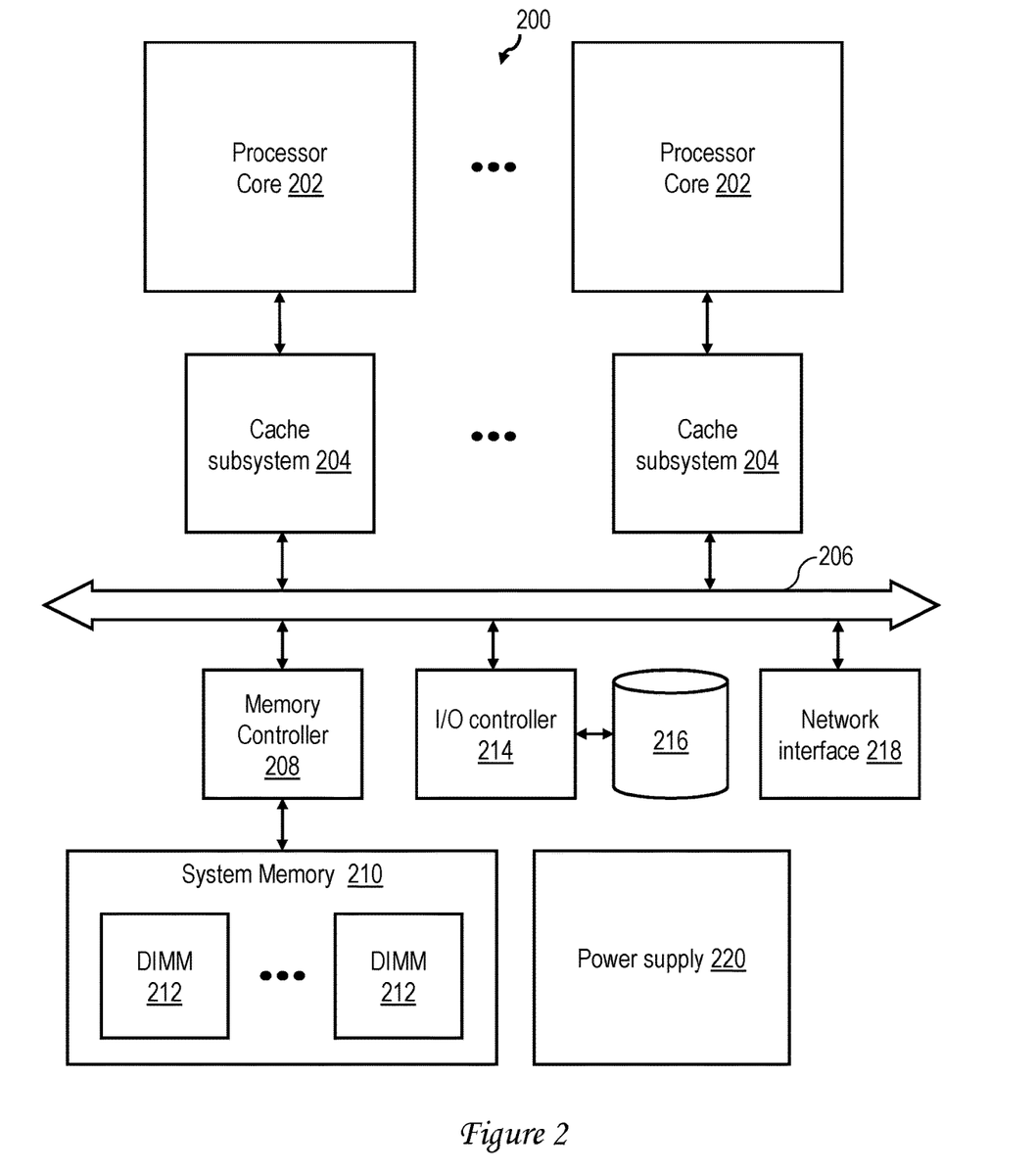
FIG. 2 is a more detailed block diagram of a data processing system that may be utilized to implement any of the host platforms in the data processing environment of FIG. 1.

Referring now to FIG. 2, there is depicted a more detailed block diagram of an exemplary data processing system 200 that may be utilized to implement any one of the host platforms depicted in the exemplary data processing environment of FIG. 1. In some implementations, data processing system 200 may form an individual drawer 112 of a server computer system 108.

Data processing system 200 includes one or more processor cores 202 for processing instructions and data. Processor cores 202 may implement any of a number of available processor architectures, such as ARM®, POWER™, Intel® x86, or Apple® silicon. Low latency data storage can be provided for each of processor cores 202 by an associated cache subsystem 204, at least a portion of which can be incorporated within the associated processor core 202 in some embodiments. Processor cores 202 and cache subsystems 204 are communicatively coupled to a system interconnect 206, such as a bus or switch. System interconnect 206 can be utilized to convey various requests (commands), coherence information, and data between processor cores 202 and cache subsystems 204, as well as between processor cores 202 and other components coupled to system interconnect 206.

Data processing system 200 may additionally include local storage coupled to system interconnect 206. For example, in the illustrated embodiment, data processing system 200 includes a system memory 210 (e.g., dynamic random access memory (DRAM) or flash memory) that may store program code and/or input or output data for the processing performed by processor cores 202. System memory 210, which can include multiple dual in-line memory modules (DIMMs) 212, is accessed and controlled via a memory controller 208 coupled to system interconnect 206.

As further illustrated in FIG. 2, data processing system 200 can also include an input/output (I/O) controller 214 for interfacing one or more I/O devices (e.g., non-volatile storage 216) and a network interface 218 for communicatively coupling data processing system 200 to one or more external networks, such as one or more of network(s) 120. Each of the components of data processing system 200 is further coupled via unillustrated power connections to a power supply 220, which supplies each of the components of data processing system 200 with power of the appropriate voltage(s) and current(s), for example, from mains power and/or a battery.

Those skilled in the art will appreciate that the generalized data processing system architecture given in FIG. 2 omits many well-known details not necessary for an understanding of the disclosed inventions. Further, it will be understood that the disclosed inventions are not limited by the general data processing system architecture shown in FIG. 2; rather, the disclosed inventions are applicable to data processing systems having a wide variety of architectures, including those employed in currently available and future-developed implementations of the host platforms shown in FIG. 1.

Figure 3:
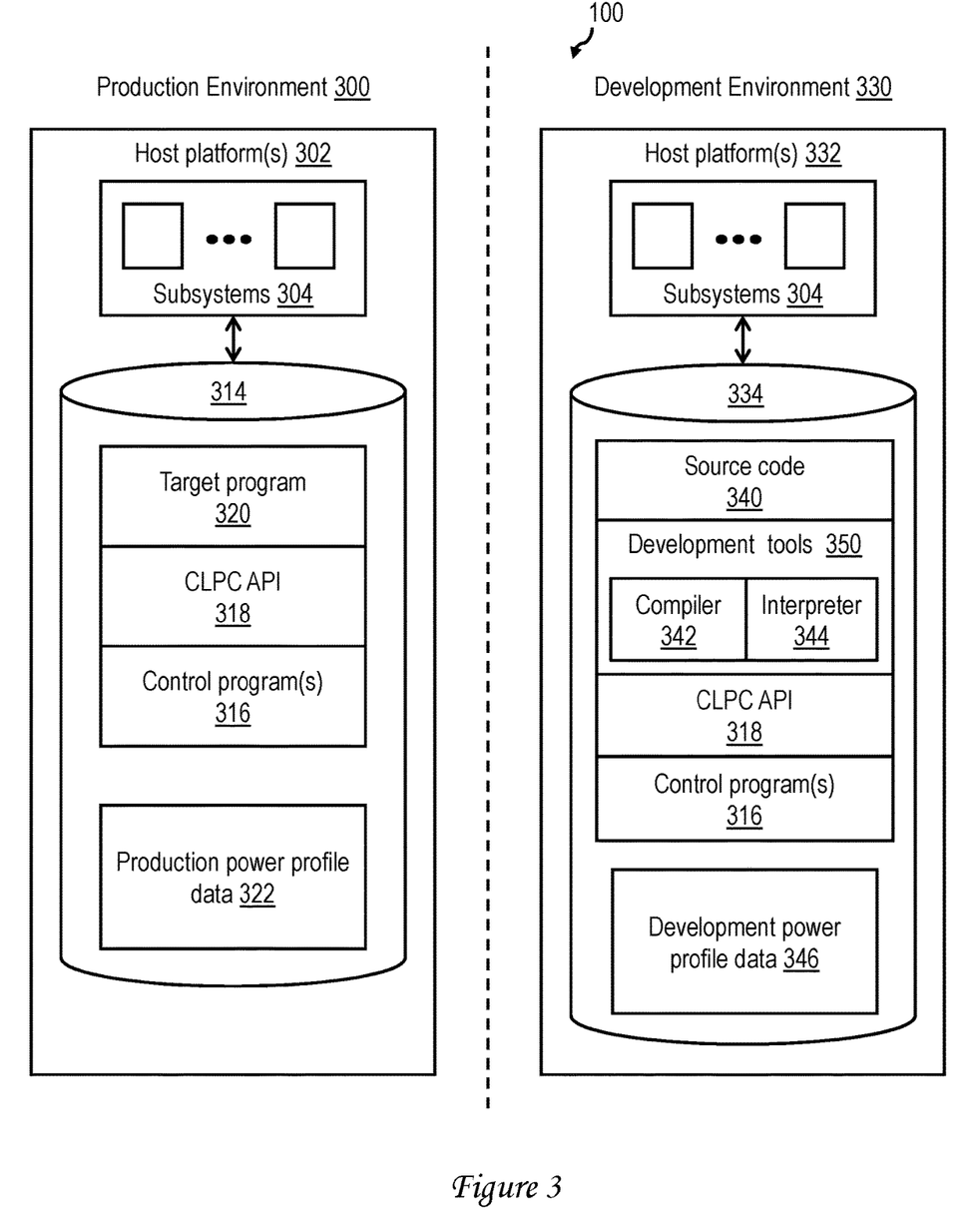
FIG. 3 is a high-level block diagram of a production environment in which program code is executed as a workload and a development environment in which program code and/or its architecture can be power-optimized in accordance with at least one embodiment.

With reference now to FIG. 3, there is illustrated another view of exemplary data processing environment 100 in which a first set of one or more host platforms are employed as a production environment 300 in which program code is executed as a workload and a second set of one or more host platforms (which may overlap with the first set) serve as a development environment in which program code and/or its architecture can be power-optimized in accordance with at least one embodiment. Specifically, FIG. 3 illustrates a production environment 300 including one or more host platforms 302 utilized to execute a code stack in order to perform work and a development environment 300 in which one or more host platforms 332 are utilized to create program code and/or create new versions (releases) of program code for deployment within production environment 300. In production environment 300, each host platform 302, which may have the general data processing system architecture given in FIG. 2, includes a number of individual subsystems 304, for example, (1) processor cores 202 and cache subsystems 204, (2) the memory subsystem (e.g., memory controller 208 and system memory 210), (3) the I/O subsystem (e.g., I/O controller 214 and any attached I/O buses, I/O hubs, and I/O devices), (4) the network subsystem (e.g., network interface 218), and (5) interconnect subsystem (e.g., system interconnect 206). Although data storage system 314 can be considered to be part of a subsystem 304 of host platform 302, a data storage system 314 is illustrated separately from other subsystems 304 in FIG. 3 in order to highlight some of the program code and data within production environment 300.

In the illustrated example, the program code executed by host platform 302 in production environment 300 includes control program(s) 316, which may include, for example, a hypervisor (or virtual machine monitor (VMM)) and/or one or more operating system instances. Control program(s) 316 allocate the hardware and software resources of host platform 302 among various application program including a target program 320 and provide access to low-level granular information (including power data) regarding the utilization of the hardware and software resources of host platform 302. In addition, the program code of host platform 302 includes Cross-layer Power Coding (CLPC) code to facilitate runtime monitoring and analysis of power usage by a workload, such as target program 320. In some embodiments, CLPC code can be incorporated within control program(s) 316. However, in the depicted embodiment, the CLPC code is implemented as an application programming interface (API) 318 through which the power data available to control program(s) 316 can be accessed. CLPC API 318 preferably supports a variety of functions for monitoring, recording, and analyzing the individual power consumption of each of subsystems 304 attributable to the execution of target program 320. The power data collected and generated by CLPC API 318 within production environment 300 is recorded in data storage data storage system 314 as production power profile data 322. In an exemplary embodiment, power profile data 322, which can conveniently be organized and accessed in a database, includes or can be processed to obtain: (1) workload traffic intensity, which can be expressed, for example, as operations, requests, and/or data volume per unit time, (2) traffic power cost, which can be expressed as watts/data/time, and (3) workload power consumption (watts). The relationship between these quantities can be expressed mathematically as follows:

Workload Traffic Intensity(requests/time)*Traffic Power Cost(watts (W)/requests/time)=Workload Power Consumption (W)

Turning now to development environment 330, each host platform 332 can include a similar collection of subsystems 304 as described above with respect to host platform 302 of production environment 300 and data processing system 200 of FIG. 2. Host platform 332 includes as part of one of subsystems 304 a data storage system 334, which stores, among other things, program code and data employed in the development and updating of source code 340. This program code includes not only control program(s) 316 as previously described, but also one or more development tools 350 to process source code 340 into an executable target program 320. For example, for source code 340 written in a compiled language, such as C++, the development tools 350 may comprise a compiler 342 and its associated tool suite. For source code 340 written in an interpreted language, such as PHP, Ruby, Python, or JavaScript, the development tools 350 may include an interpreter 344 and its associated tool suite. The code stack in development environment 330 additionally includes CLPC API 318, which includes functions that can be accessed by development tools 350 to power-optimize source code and/or its software architecture based on development power profile data 346 estimating the power response of a host platform 302 to target program 320 in production environment 300.

Figure 4:
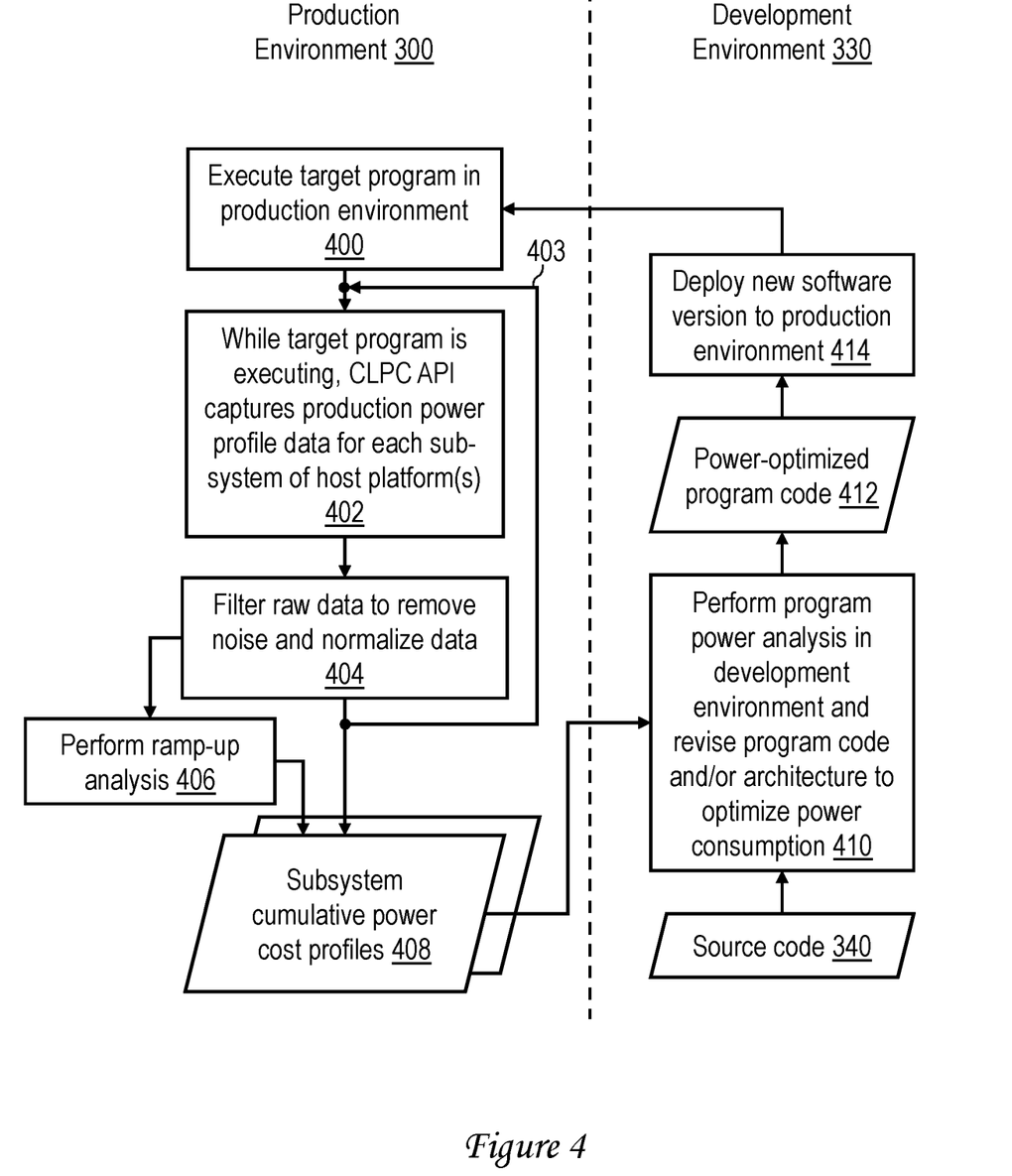
FIG. 4 is a high-level data flow diagram of an exemplary process of power profiling in a production environment and the use of production power profiles, within a development environment, to power-optimize program code and/or its architecture in accordance with one embodiment.

Referring now to FIG. 4, there is depicted a high-level data flow diagram of an exemplary process of power profiling in a production environment 300 and the use of the production power profile to power-optimize development of program code and/or its architecture in a development environment 330 in accordance with one embodiment.

At block 400, one or more host platforms 302 of production environment 300 execute target program 320 as a workload. The execution of target program 320 entails utilization of a plurality of subsystems 304 of host platform(s) 302, for example, to execute instructions to consume and produce data, to access data from and store data to memory and bulk data storage, to make I/O accesses, to transmit and receive data on system interconnect 206 and/or network 120, etc. As shown at block 402, while the target program 320 is executing, CLPC API 318 captures, via calls to control program(s) 316, individual production power profile data 322 for each subsystem 304 of host platform 302. As noted above, production power profile data 322 preferably includes at least workload traffic intensity data and workload power consumption data. The collection of production power profile data 322 via CLPC API 318 is substantially non-intrusive to the operation of host platforms 302 in production environment 300 and, unlike intrusive hardware-based power monitoring techniques, does not disturb the fundamental power consumption characteristics of target program 320. Avoiding invasive approaches enables collection of production power profile data 322 in production environments 300, such as cloud computing environments, to which software developers are unlikely to have direct access. As indicated by arrow 403, the process of block 402 is preferably performed iteratively (e.g., at regular intervals) to capture sufficient power profile data to accurately represent the behavior of various subsystems 304 over the course of the execution of the target program 320. CLPC API 318 filters production power profile data 322 to remove noise and normalize the production power profile data 322. In one preferred embodiment, CLPC API 318 employs a Kalman filter to filter the power consumption data at block 404, for example, to provide highly accurate production power profile data 322 even in the presence of noisy and/or inaccurate raw power data.

At block 406, CLPC API 318 additionally performs (or invokes separate program code to perform) a ramp-up analysis of each subsystem 304 to determine, via regression analysis, the relationship between workload power consumption and workload traffic intensity for each subsystem 304. For example, in one embodiment of the ramp-up analysis, CLPC API 318 determines a normalized workload power consumption for each subsystem 304 of host platform 302 at data points across the full range of request rates (i.e., workload traffic intensity) relevant for that subsystem 304. Based on the ramp-up analysis performed at block 406 and the normalized and filtered power profile data obtained at blocks 402 and 404, CLPC API 318 generates cumulative power cost profiles 408 for the subsystems 304 of host platform 302 (block 408). These cumulative power cost profiles form a portion of production power profile data 322 of FIG. 3. It should be noted that, for large scale systems, such as data center 110, the cumulative power cost for the target program 320 can be determined per subsystem 304, per drawer 112, per server computer system 108, and/or for the entire data center 110. Of course, the cumulative power cost for multiple different software programs can be summed to determine the cumulative power cost for all software executing on a host platform or set of host platforms.

Figure 5:
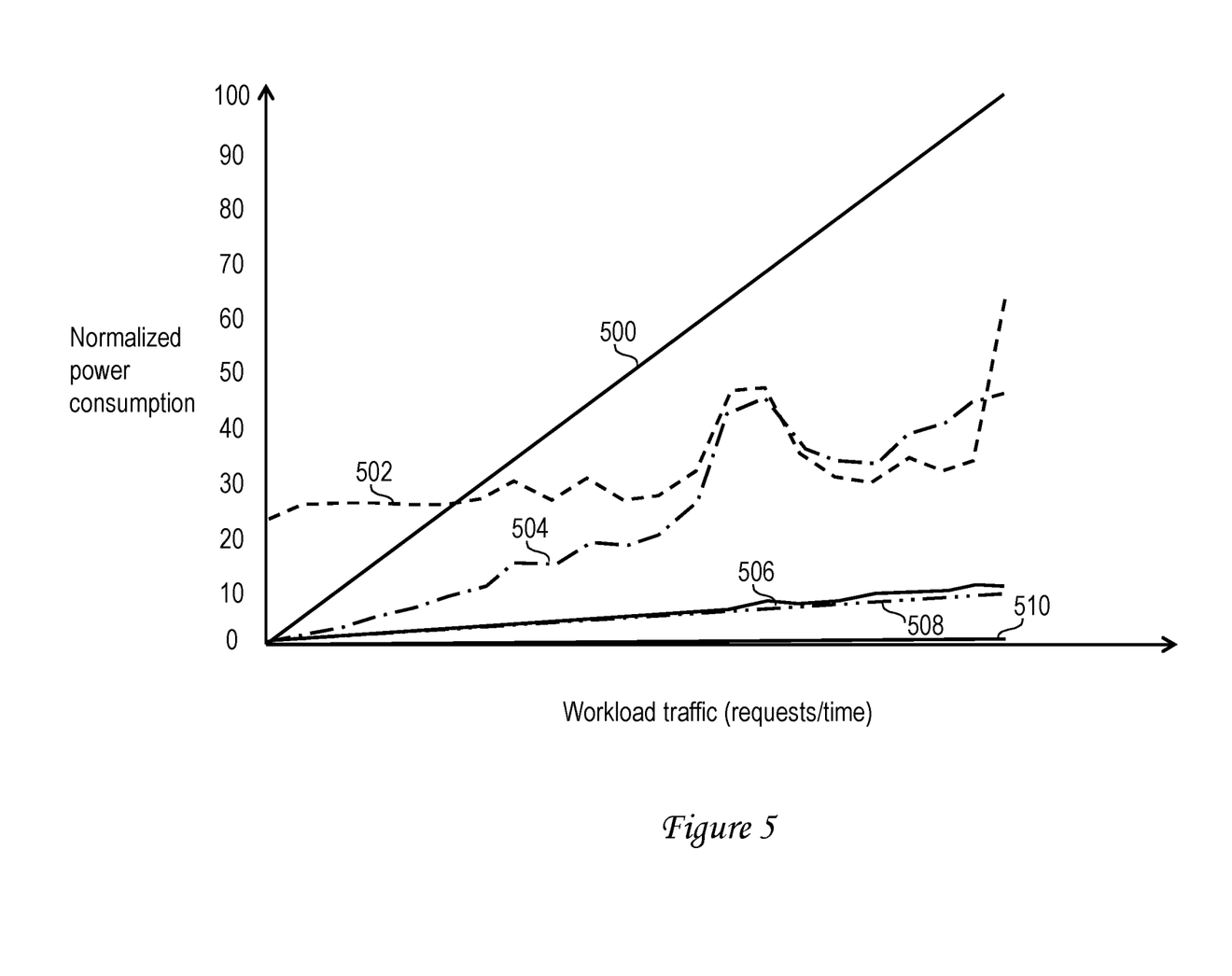
FIG. 5 is a graph of power cost profiles of each of the subsystems of an exemplary host platform in a production environment in accordance with one embodiment.

FIG. 5 is a graph of power cost profiles of each of the subsystems 304 of an exemplary host platform 302 in accordance with one embodiment. In particular, FIG. 5 separately illustrates the observed normalized workload power consumption for various workload traffic intensities for processor cores 202 and cache subsystems 204 (line 500), system memory 210 (line 502), data storage system 314 (line 504), I/O controller 214 and associated I/O devices (line 506), system interconnect 206 (line 508), and network interface 218 (line 510). It should be observed that although some subsystems 304 exhibit a substantially linear relationship between workload traffic intensity and workload power consumption, other subsystems 304 have non-linear power responses and, in fact, have regions of saturation in which increasing workload traffic intensity can actually lead to reduced workload power consumption.

Referring again to FIG. 4, block 410 illustrates that the production power profile data 322 collected in production environment 300, including the cumulative power cost profiles depicted at block 408, can advantageously be utilized in development environment 330 to power-optimize source code 340 and its software architecture such that a new or updated version (release) of target program 320 executes with improved power efficiency (e.g., overall lower power consumption and/or greater performance per watt of power consumed). An exemplary embodiment of the program power analysis process performed at block 410 is described in greater detail below with reference to FIG. 6. The program power analysis process of block 410 results in power-optimized program code 412, which is then deployed to production environment 300 as a new or updated version of target program 320 at block 414. FIG. 4 illustrates that this process continues iteratively over the life of the target program 320, further power-optimizing target program 320 as improvements and updates are made in the hardware of host platform 302.

Figure 6:
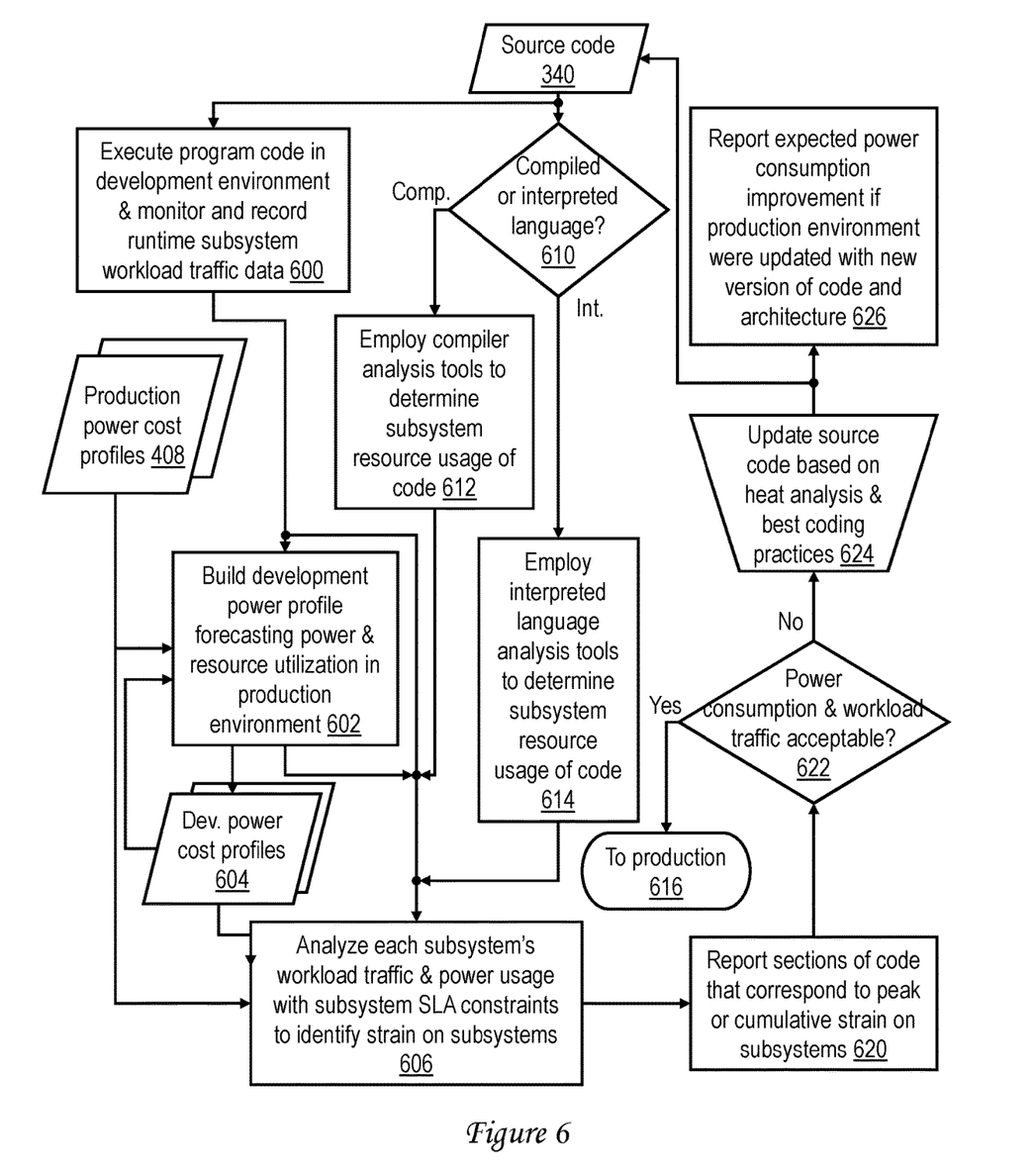
FIG. 6 is a more detailed data flow diagram depicting an exemplary process of program power analysis in a development environment in accordance with one embodiment.

Referring now to FIG. 6, there is depicted a more detailed data flow diagram depicting an exemplary process of program power analysis in a development environment 330 in accordance with one embodiment. The process of FIG. 6 begins at block 600, which illustrates a code developer utilizing compiler 342 or interpreter 344 within developments tools 350 to compile or interpret source code 340 to obtain executable program code and then executing the program code on a host platform 332 in development environment 330 utilizing a representative sample dataset. While the executable program code is executing on host platform 332, CLPC API 318 monitors and records in real time the observed subsystem workload traffic intensity and workload power consumption data.

At block 602, the code developer utilizes development tools 350 to make calls to CLPC API 318 to build and/or refine a development power cost profile 604 that can be utilized to forecast power consumption and workload traffic of target program 320 in production environment 300. If already available, CLPC API 318 can access preexisting production power cost profiles 408 of subsystems 304 that were built based on power consumption and workload traffic data captured in production environment 300, as well as any preexisting development power cost profile 604, as a starting point for the processing performed at block 602.

In addition to the dynamic power and workload traffic analysis performed at blocks 600 and 602, the code developer preferably utilizes the appropriate development tool 350 (e.g., tools associated with compiler 342 or interpreter 344) to perform static code analysis of the executable code to determine a projected resource usage of the respective resources (e.g., processor cores, memory, non-volatile storage, interconnects, etc.) each subsystem 304, as shown at block 610, 612, and 614. An example of a tool that supports determination of projected resource usage by static code analysis is Microsoft® Visual Studio.

At block 606, the code developer utilizes development tools 350 to perform a heat analysis of the executable program code based on the static code analysis performed at block 612 or 614, the production power cost profiles 408 (if available), development power cost profiles 604, and other development power profile data 346 obtained from the execution performed at block 600. In the heat analysis, the development tool analyzes the workload traffic and power consumption of each of subsystems 304 by reference to subsystem service level agreement (SLA) or other constraints, if any, and to identify any strain on the resources of subsystems 304. For example, strain on a subsystem 304 can be qualified based on the workload traffic intensity of a subsystem 304 (or a component of a subsystem) exceeding a threshold percentage (e.g., 90%) of the maximum workload traffic intensity supported by that subsystem 304 or component. At block 620, development tools 350 report to the code developer one or more sections of source code 340 that correspond to either peak or cumulative strain on one or more subsystems 304 of host platform 334.

The code developer or development tools 350 then determines at block 622 whether or not the workload power consumption and workload traffic intensity determined at block 606 is acceptable. For example, the determination made at block 622 may include whether the cumulative power cost of the executable code across all subsystems 304 satisfies a predetermined total power metric, whether the workload traffic intensity of each subsystem 304 satisfies any applicable SLA or other constraints, and whether any subsystem 304 is subject to strain. In response to an affirmative determination at block 622, the process of FIG. 6 terminates at block 616, which illustrates the code developer finalizing source code 340 and its software architecture and approving its corresponding executable for release to production environment 300.

In response to a negative determination at block 622, the code developer utilizes development tools 350 and best coding practices to update the section(s) of the source code identified at block 620 as causing strain on the one or more subsystems 304 (including, if necessary, the software architecture of the source code) in order to reduce the strain on the affected subsystems 304. Reduction in the strain on those subsystems 304 improves the power efficiency of source code 340. In the depicted embodiment, the program power analysis process of FIG. 6 continues iteratively until an affirmative determination is made at block 622. As noted at block 626, the development tool may also make calls to CLPC API 318 to report the power consumption improvement in production environment 300 that would be expected if the new version of the source code 340 were deployed as an executable. The power consumption improvement can be reported, for example, as a cumulative total, power consumption per flop, per transaction, or other unit of work, and/or a pecuniary amount.

Now that the foregoing embodiments have been described, exemplary classes that may be utilized to implement functions of CLPC API 318 are disclosed below together with explanatory comments.

```
class PowerConsumptionEstimator {
    // represents raw power data as a function
    int PowerConsumptionEstimator::estimate( int x ) {
        // estimates output value from Regression expression
        return output;
    }
    void PowerConsumptionEstimator::PrintPowerProfilePlot {
        // output a plot of the power profile
    }
}
enum subsystemEnum = {PROCESSOR, MEMORY, IO}
// user-defined hardware entities at a desired level of specificity
// MEMORY/IO often not granular enough; specific cards are preferably named
// Enums can be paired with string names to specify exact HW part numbers
class SubsystemPowerData {
    // collects subsystem power and workload traffic data
    list<int> watts;
    list<int> trafficSpeed;
    list<int> time;
    // Filtered Data (e.g., as filtered with Kalman filter)
    list<int> filteredWatts;
    list<int> filteredTrafficSpeed;
    PowerConsumptionEstimator trafficToWattsRegression;
    // hardware identifiers
    subsystemEnum type;   // HW chip design
    string subsystemName; // part number
    // facilitates collection of data through OS or other control program
    void SubsystemPowerData::collect( ) {
        watts.append( OS_Call_To_Report_Wattage(subsystemName) )
        trafficSpeed.append( OS_Call_To_Report_Traffic(subsystemName) )
        time.append( OS_Call_Timestamp( ) )
    }
    void SubsystemPowerData::KalmanFilter( ) {
        // Using watts and time, create filteredWatts
        // Using workload traffic and time, create filteredTrafficSpeed
        // Raw data is still retained
        // Using filteredWatts and filteredTrafficSpeed, create trafficToWattsRegression
    }
    int SubsystemPowerData::getWattageFromTraffic( int traffic ) {
        self.KalmanFilter( )
        return trafficToWattsRegression.estimate( traffic )
    }
}
```

-continued

```
class SystemPowerDataCollector {
  list<SubsystemPowerData> subsystemPowerList;
  list<int> programInstructionsList;
  int instructionCount;
  string systemName;
  // collect power for each subsystem in the data processing system
  void SystemPowerDataCollector::poll_for_power( ) {
    for each Subsystem in subsystemPowerList {
      Subsystem.collect( )
    }
    programInstructionsList.append( OS_Call_To_Report_Processor_Instructions )
    instructionCount += OS_Call_To_Report_Instruction_Count
  }
  // publish filtered data
  void SystemPowerDataCollector::upload_to_DB( ) {
    for each Subsystem in subsystemPowerList {
      // upload filtered data points into database
    }
  }
  // creates a new division in DB for new SW/FW/OS/HW changes
  void SystemPowerDataCollector::create_new_release( string release_name ) {
    // DB call to create new DB for software release
    for each Subsystem in subsystemPowerList {
      // Clear data
    }
  }
  // ramp up full range profiler -> if IDLE, run a self-test ramp up
  //   and collect power data for each workload traffic level
  //   serves as a basis if no production data
  // works in conjunction with application specific workload ramp-up procedure/tool
  void SystemPowerDataCollector:ramp_up_start(int interval, string test_name) {
    self.create_new_release( test_name )
    while( test incomplete ) {
      wait( interval )
      self.poll_for_power( )
    }
    // upload to DB
    // output subsystem plots
    for subsystem in system {
      subsys.trafficToWattsRegression.print( )
    }
  }
}
class TrafficPowerStatistics {
  // Traffic and subsystem identifiers are fields preferably editable by user
  // edits to Traffic fields should clear power data
  subsytemEnum type;    // as with production, used to query the DB for data from the
  string subsystemName;   // specific subsystem. Power data can be queried by all
    // similar subsystems in a data processing system or a specific single part
  int minTraffic;
  int maxTraffic;
  int nomTraffic;
  string nominalTrafficValue;
  int minWatts;
  int maxWatts;
  int avgWatts;
  int minDuration;
  int maxDuration;
  int avgDuration;
  int minProcessorInstructions;
  int maxProcessorInstructions;
  int avgProcessorInstructions;
}
class PowerReport {
  string systemName;   // data processing system identifier
  list<TrafficPowerStatistics> subsystemStats;
  int PowerReport::addTrafficAnalysis( TrafficPowerStatistics newAnalysis ) {
    subsystemStats.append( newAnalysis )
    // Call supplies the subsystem and Traffic information and preferably cannot
    // edit the Watts/Duration members of the class
    // Populate Watts and Duration using calls to DB
    // This report can query multiple traffic ranges for each subsystem
  }
}
```

In this embodiment of CLPC API 318, a code developer would use other development tools 350 for static code analysis. CLPC API 318 provides power data at given workload traffic intensities for the various subsystems. This information provides insight into how different coding practices cause differing levels of subsystem workload traffic and thus affect cumulative power consumption of program execution in production environment 300.

As has been described, in at least one embodiment, a plurality of subsystem power profiles for a corresponding plurality of subsystems of a host platform in a production data processing environment are received. Each of the subsystem power profiles specifies power consumption of a corresponding one of the plurality of subsystems across a range of workload traffic intensities. Based on the plurality of power profiles, source code and/or the software architecture of the source code is power-optimized in a development data processing environment such that, in the production data processing environment, power consumption per unit of performance of an executable program derived from the source code is improved.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude signal media per se, transitory propagating signals per se, and energy per se.

The figures and the written description are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of data processing, comprising:
capturing raw subsystem power data from a production data processing environment via an application programming interface;
based on the raw subsystem power data, developing a plurality of subsystem power profiles for a corresponding plurality of subsystems of a host platform in the production data processing environment, wherein each of the subsystem power profiles specifies power consumption of a corresponding one of the plurality of subsystems across a range of workload traffic intensities; and
based on the plurality of power profiles, power-optimizing source code in a development data processing environment such that, in the production data processing environment, power consumption per unit of performance of an executable program derived from the source code is improved.

2. The method of claim 1, further comprising generating the subsystem power profiles, wherein the generating includes:
filtering raw subsystem power data from the production data processing environment using a Kalman filter.

3. The method of claim 1, wherein power-optimizing the source code includes power-optimizing the source code based on static code analysis in the development data processing environment.

4. The method of claim 1, wherein power-optimizing the source code includes determining workload power consumption based on workload traffic intensity and traffic power cost.

5. The method of claim 1, wherein power-optimizing the source code includes iteratively power-optimizing the source code based on updated subsystem power profiles.

6. The method of claim 1, further comprising outputting a report predicting improvement in power consumption and utilization of the plurality of subsystems in the production data processing environment based on updates to the source code.

7. A computer program product, the computer program product comprising a computer readable storage medium having program instructions embodied therewith, the program instructions being executable by a processor, wherein, when executed, the program instructions cause the processor to perform:
capturing raw subsystem power data from a production data processing environment via an application programming interface;
based on the raw subsystem power data, developing a plurality of subsystem power profiles for a corresponding plurality of subsystems of a host platform in the production data processing environment, wherein each of the subsystem power profiles specifies power consumption of a corresponding one of the plurality of subsystems across a range of workload traffic intensities; and
based on the plurality of power profiles, power-optimizing source code in a development data processing environment such that, in the production data processing environment, power consumption per unit of performance of an executable program derived from the source code is improved.

8. The program product of claim 7, further comprising generating the subsystem power profiles, wherein the generating includes:
filtering raw subsystem power data from the production data processing environment using a Kalman filter.

9. The program product of claim 7, wherein power-optimizing the source code includes power-optimizing the source code based on static code analysis in the development data processing environment.

10. The program product of claim 7, wherein power-optimizing the source code includes determining workload power consumption based on workload traffic intensity and traffic power cost.

11. The program product of claim 7, wherein power-optimizing the source code includes iteratively power-optimizing the source code based on updated subsystem power profiles.

12. The program product of claim 7, further comprising outputting a report predicting improvement in power consumption and utilization of the plurality of subsystems in the production data processing environment based on updates to the source code.

13. A data processing system, comprising:
a processor core; and
data storage coupled to the processor core, wherein the data storage includes program code that, when executed by the processor core, causes the processor core to perform:
capturing raw subsystem power data from a production data processing environment via an application programming interface;
based on the raw subsystem power data, developing a plurality of subsystem power profiles for a corresponding plurality of subsystems of a host platform in the production data processing environment, wherein each of the subsystem power profiles specifies power consumption of a corresponding one of the plurality of subsystems across a range of workload traffic intensities; and
based on the plurality of power profiles, power-optimizing source code in a development data processing environment such that, in the production data processing environment, power consumption per unit of performance of an executable program derived from the source code is improved.

14. The program product of claim 13, further comprising generating the subsystem power profiles, wherein the generating includes:
filtering raw subsystem power data from the production data processing environment using a Kalman filter.

15. The program product of claim 13, wherein power-optimizing the source code includes power-optimizing the source code based on static code analysis in the development data processing environment.

16. The program product of claim 13, wherein power-optimizing the source code includes determining workload power consumption based on workload traffic intensity and traffic power cost.

17. The program product of claim 13, wherein power-optimizing the source code includes iteratively power-optimizing the source code based on updated subsystem power profiles.

18. The program product of claim 13, further comprising outputting a report predicting improvement in power consumption and utilization of the plurality of subsystems in the production data processing environment based on updates to the source code.

* * * * *